(12) United States Patent
LaFollette et al.

(10) Patent No.: US 6,765,363 B2
(45) Date of Patent: Jul. 20, 2004

(54) MICRO POWER SUPPLY WITH INTEGRATED CHARGING CAPABILITY

(75) Inventors: Rodney M. LaFollette, Provo, UT (US); Pritpal Singh, Media, PA (US)

(73) Assignee: U.S. Microbattery, Inc., Farmington, CT (US)

( * ) Notice: Subject to any disclaimer, the term of this patent is extended or adjusted under 35 U.S.C. 154(b) by 54 days.

(21) Appl. No.: 10/164,147

(22) Filed: Jun. 5, 2002

(65) Prior Publication Data

US 2003/0006737 A1 Jan. 9, 2003

Related U.S. Application Data

(63) Continuation-in-part of application No. 09/037,801, filed on Mar. 10, 1998, now abandoned.
(60) Provisional application No. 60/296,035, filed on Jun. 5, 2001.

(51) Int. Cl.[7] .................................................. H02J 7/00
(52) U.S. Cl. ........................ 320/107; 320/101; 429/52
(58) Field of Search ................................ 320/107, 101, 320/138; 429/99, 100, 52

(56) References Cited

U.S. PATENT DOCUMENTS

| | | | | |
|---|---|---|---|---|
| 4,935,742 | A | * 6/1990 | Marin | 342/13 |
| 5,138,534 | A | * 8/1992 | Wu | 362/464 |
| 5,773,956 | A | * 6/1998 | Wieczorek | 320/152 |
| 6,011,379 | A | 1/2000 | Singh et al. | 320/132 |
| 6,197,450 | B1 | 3/2001 | Nathan et al. | 429/236 |
| 6,610,440 | B1 | 8/2003 | LaFollette et al. | 429/122 |

OTHER PUBLICATIONS

John N. Harb, Rodney M. LaFollette, Richard H. Selfridge, Larry L. Howell; "Microbatteries for Self–Sustained Hybrid Micropower Supplies"; *Journal of Power Supplies*; May 2001, pp. 1–19.

R. Lafollette, P. Humble, J. Harb, C. Fennie, J. Dai, and D. Reisner, "Microscopic, Integrable, Rechargeable Batteries for MEMS", No Date.

Jagadeesan Rajagopalan, Pritpal Singh, Rodney LaFollette, and David Reisner; "Architecture and Preliminary Design of a Fuzzy Logic–Based Microbattery Charge Controller", no date.

David Ryan, Rodney M. LaFollette, and John N. Harb; "Power Supply Concepts for Remote, Autonomous Sensors"; pp. 1–6, no date.

Pritpal Singh, Jagadeesan Rajagopalan, Rodney LaFollette, Craig Fennie, Jr. and David E. Reisner; "Fuzzy Logic–Based Microbattery Controller for MEMS Applications;" *American Institute of Aeronautics and Astronautics (AIAA)*; 2001; pp. 1–5, no month.

Pritpal Singh, Jagadeesan Rajagopalan, Rodney LaFollette, Craig Fennie, Jr. and David E. Reisner; "Fuzzy Logic–Based Solar Charge Controller for MicroBatteries;" pp. 1–4, no date.

Research in Electrochemical Engineering, "Microbatteries for Micromachines (MEMS)"; from http://www.et.byu.edu/jharb/research.html, 2000 no month.

(List continued on next page.)

*Primary Examiner*—Lawrence Luk
(74) *Attorney, Agent, or Firm*—Cantor Colburn LLP

(57) ABSTRACT

An integrated micro power supply is disclosed. In an exemplary embodiment, the micro power supply includes a microbattery formed within a substrate and an energy gathering device for capturing energy from a local ambient environment. An energy transforming device is also formed within the substrate for converting energy captured by the energy gathering device to electrical charging energy supplied to the microbattery.

17 Claims, 2 Drawing Sheets

OTHER PUBLICATIONS

Closed Loop Control, Chapter 7—Switch Mode Power Supply; from www.powerdesigner.com/InfoWeb/resources/pe_html/ch07sl/intro.html; pp. 1–5, no date.

P. Singh, S. Kaneria, V. Anugonda, H. M. Chen, X. Q. Wang, D.E. Reisner, and R. M. LaFollette; "Micropower Supply for Sensors", no date.

R. M. LaFolletter, J.N. Harb, and P. Humble; "Microfabricated Secondary Batteries for Remote, Autonomous, Electronic Devices;", no date.

Marc Madou; "Electrochemical Sensors;" Fundamentals of Microfabrication; 1997; pp. 469–474.

W. P. Mulligan, A. Terao, D. D. Smith P. J. Verlinden, and R. M. Swanson; "Development of Chip–Size Silicon Solar Cells;" IEEE, 2000; pp. 158–163.

* cited by examiner

US 6,765,363 B2

MICRO POWER SUPPLY WITH INTEGRATED CHARGING CAPABILITY

CROSS REFERENCE TO RELATED APPLICATIONS

This application is a continuation-in-part of U.S. application Ser. No. 09/037,801, filed Mar. 10, 1998, now abandoned the contents of which are incorporated by reference herein in their entirety.

This application further claims the benefit of U.S. provisional application No. 60/296,035, Attorney Docket No. USM-0001, filed Jun. 5, 2001, the contents of which are incorporated by reference herein in their entirety.

STATEMENT OF GOVERNMENT INTEREST

The U.S. Government may have certain rights in the present invention as provided for by the terms of U.S. Army contract No. DAAH01-00C-R027 awarded by DARPA.

BACKGROUND

The present disclosure relates generally to power supplies for microelectromechanical systems (MEMS) and, more particularly, to a micro power supply with integrated charging capability.

With the development of microelectronic fabrication methods for manufacturing microelectromechanical systems (MEMS) devices, such as microminiature motors, actuators, sensors, etc. in silicon wafers, there has developed a need for micro power supplies to provide the power to operate these devices. Conventional small button cells or similar small batteries are currently used to meet these power needs. Recently, a new technology has been developed to fabricate microbatteries using conventional silicon microelectronic processing techniques. Ni—Zn microbatteries have been produced by chemical processing steps employing a combination of photolithographic techniques, wet and dry chemical etching methods, rinsing steps, and thermal evaporation of metal contacts.

While these microbatteries are fully integrateable in a silicon wafer, they offer limited capacity as a primary battery. However, as secondary batteries, they have the capability of being recharged. The present techniques for recharging the microbatteries involve using a power source located externally with respect to the silicon wafer. Unfortunately, this limits the ultimate miniaturization of a micro power supply incorporating microbatteries.

SUMMARY

The above discussed and other drawbacks and deficiencies of the prior art are overcome or alleviated by micro power supply. In an exemplary embodiment, the micro power supply includes a microbattery formed within a substrate and an energy gathering device for capturing energy from a local ambient environment. An energy transforming device is also formed within the substrate for converting energy captured by the energy gathering device to electrical charging energy supplied to the microbattery.

In a preferred embodiment, the energy gathering device is also formed within the substrate. A fuzzy-logic based charge controller device is further formed within the substrate for controlling the flow of charging current and output voltage from the energy transforming device to the microbattery. The charge controller device selectively couples the energy transforming device to the microbattery through switching of a pulse width modulation circuit.

In another embodiment, an integrated, rechargeable micro power supply for a microelectromechanical system (MEMS) includes a microbattery formed within a semiconductor substrate, and a solar cell, formed within the substrate, for capturing light energy from a local ambient environment. The solar cell converts the light energy into electrical charging energy to be supplied to the microbattery. A charge controller device is also formed within the substrate, and selectively couples the solar cell to the microbattery.

BRIEF DESCRIPTION OF THE DRAWINGS

Referring to the exemplary drawings wherein like elements are numbered alike in the several Figures.

DETAILED DESCRIPTION

Disclosed herein is a fully integrated micro power supply including a microbattery, an energy gathering device (i.e., an energy scavenger) and associated battery charging device. Such a micro power supply may be further integrated with a sensor platform into a single integrated circuit substrate including a sensor, a transceiver unit, and a microprocessor to form a complete integrated, autonomous sensor unit.

Figure 1:
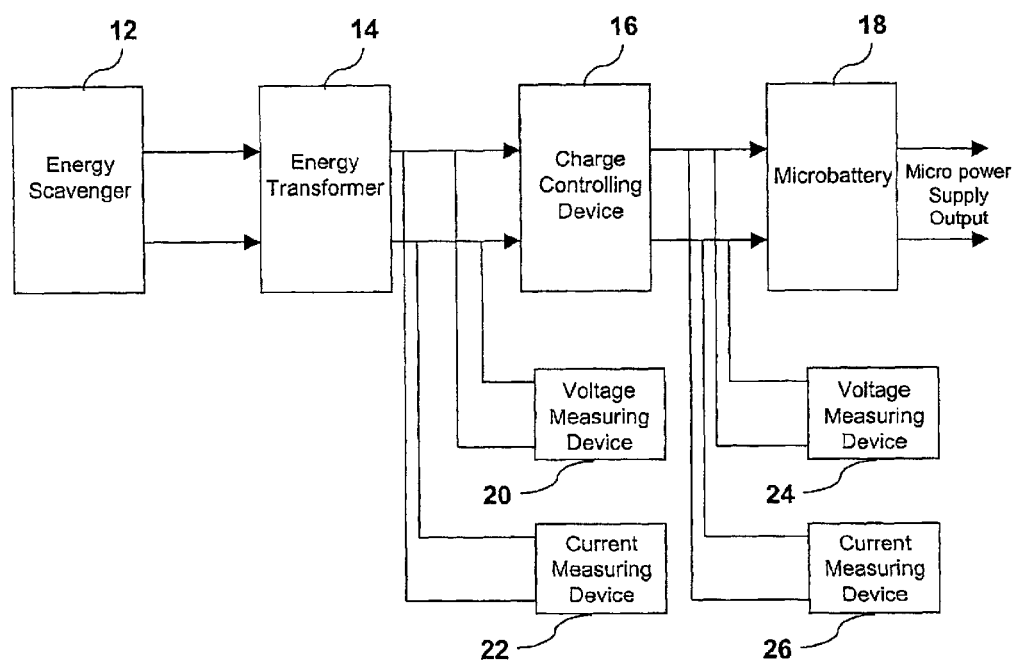
FIG. 1 is a block diagram of an integrated micro power supply formed by microelectronic processing techniques, in accordance with an embodiment of the invention.

Referring initially to FIG. 1, there is shown a block diagram of an integrated micro power supply 10, in accordance with an embodiment of the invention. The integrated power supply 10 includes an energy gathering device (scavenger) 12 which captures energy from the local environment, such as for example sound energy, heat energy, light energy, chemical energy, vibrational energy, electromagnetic energy, piezoelectric energy. The gathered energy is then transformed into a direct current form of electricity by means of an energy transformer 14. If the output from the energy gathering device 12 is already in a direct current form, (such as the output of a solar cell for example), the need for an energy transformer is obviated. The direct current output of the energy transformer 14 is fed to the input lines of a charge controlling device 16. The charge controlling device 16 adjusts both the current and voltage outputs from the energy transformer in order to provide appropriate current and voltage charging levels for a microbattery 18.

Algorithms used to control the charging current and voltage output from the charge controlling device 16 are software-embedded therein. The output voltage and current of the micro power supply 10 emanate from the microbattery 18. A first voltage measuring device 20 and a first current measuring device 22 are used to measure the voltage and current outputs from the scavenger/transformer (12, 14) pair, while a second voltage measuring device 24 and a second current measuring device 26 are used to measure the voltage and current outputs of the charge controlling device 16 to the microbattery 18. Some or all of these voltage and current values may be used as control variables for controlling the charging of the microbattery 18.

Figure 2:
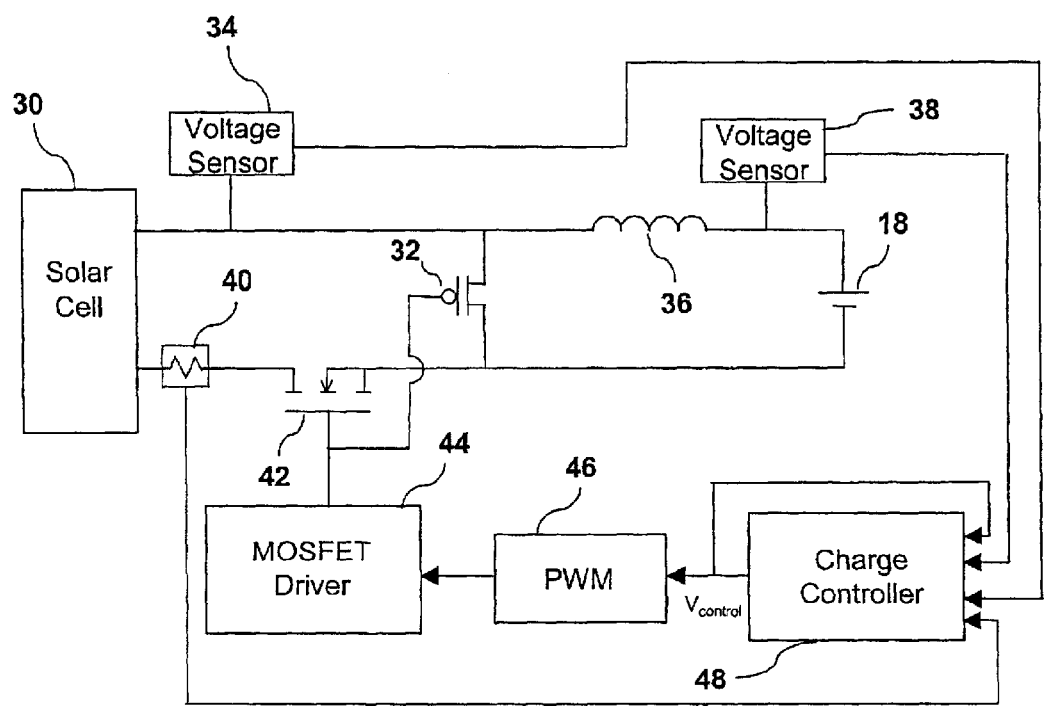
FIG. 2 is a schematic diagram of exemplary embodiment of the micro power supply shown in FIG. 1.

FIG. 2 shows a particular exemplary embodiment of the micro power supply 10 shown in FIG. 1. The energy gathering device 12 in this example is a photovoltaic solar cell 30 that transforms light energy from the local environment into electrical current and voltage. Since the output of the solar cell 30 is already in a direct current form, the solar cell 30 performs the dual role of energy gathering device 12 and energy transformer 14 in this particular embodiment. The direct current output from the solar cell 30 depends on the intensity of light incident thereupon. The more intense the light input, the larger the current and voltage output of the solar cell 20.

The charge controlling device 16 of this embodiment is a step-down buck converter including a PMOS transistor 32, a first voltage sensor 34, an inductor 36, a second voltage sensor 38, a current sensor 40, a metal oxide semiconductor field effect transistor (MOSFET) 42, a MOSFET driver circuit 44, a pulse width modulation (PWM) circuit 46, and a charge controller 48. The MOSFET 42 in this circuit is operated as a switch, with the PWM circuitry 46 controlling the duty cycle of the switch (i.e., the time during which the switch is on as a fraction of the total switching time period of the switch). Since the PWM circuitry 46 is generally not capable of providing sufficient drive current to switch the MOSFET 42 on and off rapidly, the MOSFET driver circuit 44 is incorporated. The charge controller circuitry preferably has high current sinking capability for switching the MOSFET 42 on and off rapidly.

During the time interval that the MOSFET 42 switch is on (or closed), current flowing from the solar cell 30 to the microbattery 18 increases with time thereby charging the microbattery 18 and increasing the energy stored within the inductor 36. In other words, as current flow increases through the inductor 36, the strength of the magnetic field stored therein increases. In addition, during the time interval that the MOSFET 42 switch is conducting current, the PMOS transistor 32 is non-conductive since the driving signal applied to the MOSFET 42 is also applied to the gate of the PMOS transistor 32. When the MOSFET 42 switch is turned off, current no longer flows out of the solar cell 30. However, the stored energy within the inductor 36 acts a source, and the PMOS transistor 32 is now conductive, thereby providing a current path for current to flow into the inductor 36. The strength of the magnetic field stored within the inductor 36 weakens, thus resulting in a decrease in the current flowing therethrough.

It will further be appreciated the signals applied to the gates of the transistor pair 32 may be taken from the gate signal applied to the MOSFET 42. In addition, those skilled in the art will recognize that a filter capacitors may also be used in conjunction with the input and output voltages of the buck converter circuit.

The current flowing through the microbattery 18 also decreases during this interval. The charging current over the entire switching cycle of the MOSFET 42 is the average of the rising current during the time that the MOSFET 42 is conductive and the falling current during the time that the MOSFET 42 is non-conductive. This average charging current may be controlled by varying the duty cycle of the MOSFET 14, which is in turn controlled by software algorithms programmed into the charge controller 48.

The charge controller 16 is preferably a microcontroller having sufficient memory for storing charge control software. In a particular embodiment of the present invention, the charge control algorithms use a fuzzy logic-based method for determining the requisite charging current and voltage supplied to the microbattery 18. The inputs to the fuzzy logic model include the voltage across the solar cell 30 (as measured by the first voltage sensor 34), the current output from the solar cell 30 (as measured by the current sensor 40), the voltage across the microbattery 18 (as measured by the second voltage sensor 38) and the control voltage, $V_{control}$, to the PWM circuit 46. In other words, the output voltage of the fuzzy model is fed back in a closed loop fashion to provide the voltage $V_{control}$. Additional information regarding the use of a fuzzy logic method for determining the state of charge of a battery may be found in U.S. Pat. No. 6,011,379 to Singh, et al., the contents of which are incorporated by reference herein in their entirety.

Each of the components illustrated in the embodiment of FIG. 2 may be fabricated into a single semiconductor substrate (e.g., a silicon substrate) using conventional microelectronic fabrication techniques including, but not limited to: photolithography, wet and dry chemical etching, rinse steps, and deposition or evaporation of metals. For example, those skilled in the art will recognize that silicon solar cells are routinely manufactured for both terrestrial and space applications using conventional microelectronic fabrication techniques. In addition, microcontrollers, PMOS devices, NMOS devices, MOSFETs, MOSFET drivers and PWM circuits are all available as commercial silicon integrated circuit products. Ni—Zn microbatteries have also been fabricated using conventional silicon microelectronic fabrication techniques. More recently, inductor coils have also been manufactured using conventional silicon microelectronic fabrication techniques.

Although the illustrated embodiment of FIG. 2 depicts a solar cell as a scavenger/transformer, other energy gathering and transforming devices could be used. For example, an RF antenna could be configured to receive RF emissions, and an appropriate rectifying/impedance matching network could be used to supply DC charging energy to the charge controlling device 16. Also, an acoustic membrane may also be used to gather sound vibrations and convert that energy to electrical signals, similar to the operation of a microphone.

Through the use of the above described invention embodiments, an integrated micro power supply is realized wherein each of the components are individually manufactured using conventional silicon microelectronic fabrication methods. As a result, the prior limitations on the functional capability of remote, autonomous MEMS devices, such as sensors, are alleviated. Moreover, the present integration capability allows for further device miniaturization as integrated circuit devices become smaller and smaller.

While the invention has been described with reference to a preferred embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A micro power supply, comprising:
   a microbattery formed within a substrate;
   an energy gathering device for capturing energy from a local ambient environment;
   an energy transforming device formed within said substrate for converting energy captured by said energy gathering device to electrical charging energy supplied to said microbattery; and
   a charge controlling device formed within said substrate for controlling the flow of charging current and output voltage from said energy transforming device to said microbattery.

2. The micro power supply of claim 1, wherein said energy gathering device is formed within said substrate.

3. The micro power supply of claim 1, wherein said charge controlling device further comprises a fuzzy logic system.

4. The micro power supply of claim 3, wherein said charge controlling device selectively couples said energy transforming device to said microbattery through the application of a control signal to a pulse width modulation circuit.

5. The micro power supply of claim 4, further comprising a MOSFET switch driven by the output of said pulse width modulation circuit.

6. The micro power supply of claim 5, further comprising a MOSFET driver circuit for receiving said output of said pulse width modulation circuit and driving said MOSFET switch.

7. The micro power supply of claim 3, wherein said charge controlling device further comprises a plurality of inputs thereto, said plurality of inputs including a voltage and current output from said energy transforming device, and a voltage input to said microbattery.

8. The micro power supply of claim 7, wherein said plurality of inputs to said charge controlling device further includes said control signal.

9. The micro power supply of claim 1, wherein said energy gathering device and said energy transforming device further comprise a solar cell.

10. An integrated, rechargeable micro power supply for a microelectromechanical system (MEMS), comprising:
    a microbattery formed within a semiconductor substrate;
    a solar cell, formed within said substrate, for capturing light energy from a local ambient environment, said solar cell converting said light energy into electrical charging energy to be supplied to said microbattery; and
    a charge controlling device, formed within said substrate, for selectively coupling said solar cell to said microbattery.

11. The micro power supply of claim 10, wherein said charge controlling device farther comprises:
    a buck converter circuit driven by a pulse width modulation (PWM) circuit; and
    a charge controller for providing a control signal to said PWM circuit, said charge controller being based upon a fuzzy logic control algorithm.

12. The micro power supply of claim 11, wherein said charge controlling device selectively couples said solar cell to said microbattery through the application of said control signal to said PWM circuit.

13. The micro power supply of claim 12, wherein said charge controller further comprises a plurality of inputs thereto, said plurality of inputs including a voltage and a current output from said solar cell, and a voltage input to said microbattery.

14. The micro power supply of claim 13, wherein said charge controlling device further comprises a MOSFET switch driven by the output of said PWM circuit.

15. The micro power supply of claim 14, wherein said charge controlling device further comprises a MOSFET driver circuit for receiving said output of said PWM circuit and driving said MOSFET switch.

16. The micro power supply of claim 15, wherein said plurality of inputs to said charge controlling device further includes said control signal.

17. The micro power supply of claim 15, wherein said buck converter circuit further comprises:
    an inductor in series between said solar cell and said microbattery; and
    a PMOS transistor for providing a current conduction path through said inductor when said MOSFET switch is in a non-conductive state.

* * * * *